(12) United States Patent
Park et al.

(10) Patent No.: US 6,242,380 B1
(45) Date of Patent: Jun. 5, 2001

(54) PROCESS FOR PREPARING SUPPORTED NICKEL CATALYST FOR REFORMING HYDROCARBONS

(75) Inventors: Sang-Eon Park; Jong-San Chang; Kyu-Wan Lee, all of Daejeon (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 0 days.

(21) Appl. No.: 08/978,799

(22) Filed: Nov. 26, 1997

Related U.S. Application Data

(63) Continuation-in-part of application No. 08/601,025, filed on Feb. 23, 1996, now Pat. No. 5,855,815, and a continuation-in-part of application No. 08/393,872, filed on Feb. 24, 1995, now abandoned.

(30) Foreign Application Priority Data

Feb. 26, 1994 (KR) .................................................. 94-3644

(51) Int. Cl.[7] ........................... B01J 29/46; B01J 37/08
(52) U.S. Cl. .......................... 502/337; 502/66; 502/71; 502/259; 502/328; 502/330; 502/514
(58) Field of Search ................................... 502/337, 332, 502/341, 246, 259, 66, 67, 71, 74, 77, 330, 328, 514

(56) References Cited

U.S. PATENT DOCUMENTS

| 3,945,944 | * | 3/1976 | Kanig | 252/455 R |
| 4,026,823 | * | 5/1977 | Van Hook et al. | 252/472 |
| 4,042,615 | * | 8/1977 | Vannice et al. | 260/449.6 R |
| 4,209,424 | * | 6/1980 | Le Goff et al. | 252/474 |
| 4,284,531 | * | 8/1981 | Simpson et al. | 252/465 |
| 4,772,750 | * | 9/1988 | Habermann | 252/465 |
| 5,130,114 | * | 7/1992 | Igarashi | 423/652 |

FOREIGN PATENT DOCUMENTS 57-156303   9/1982  (JP) .

OTHER PUBLICATIONS

J. Chem. Soc. Faraday Trans., 1994, 90(1), 193–202 Influence of Prep. Method on the Acidity of $MoO_3$ $WO_3$)/$ZrO_2$ Catalysts. Afanasiev, Genatet, Breysse, Coudurier, Vedrine.

* cited by examiner

Primary Examiner—Bakir L. Yildirim
(74) Attorney, Agent, or Firm—Ladas & Parry

(57) ABSTRACT

A process for preparing supported nickel catalyst consisting of supporting nickel or metal salt of nickel, alkali metal, alkaline earth metal having low melting point on silicon and aluminum-containing support having high surface area such as zeolite, silica and alumina as an oxide by melting effectively nickel or metal salt of nickel, alkali metal and alkaline earth metal having low melting point is disclosed. This process is characterized in that the supported nickel catalyst prepared by the present invention can be used in reforming reaction of hydrocarbons by using carbon dioxide, steam and oxygen as an oxidant. Metal salts used in the preparation of supported nickel catalyst is generally nitrate, chloride, acetate and carbonate having low melting point of 500° C. or less. The contents of nickel, alkali metal and alkaline earth metal of the catalyst are 1 to 20% by weight, 10% by weight or less and 20% by weight or less, respectively. The calcination temperature of the catalyst is in a range of 300° C. to 1200° C.

20 Claims, 1 Drawing Sheet

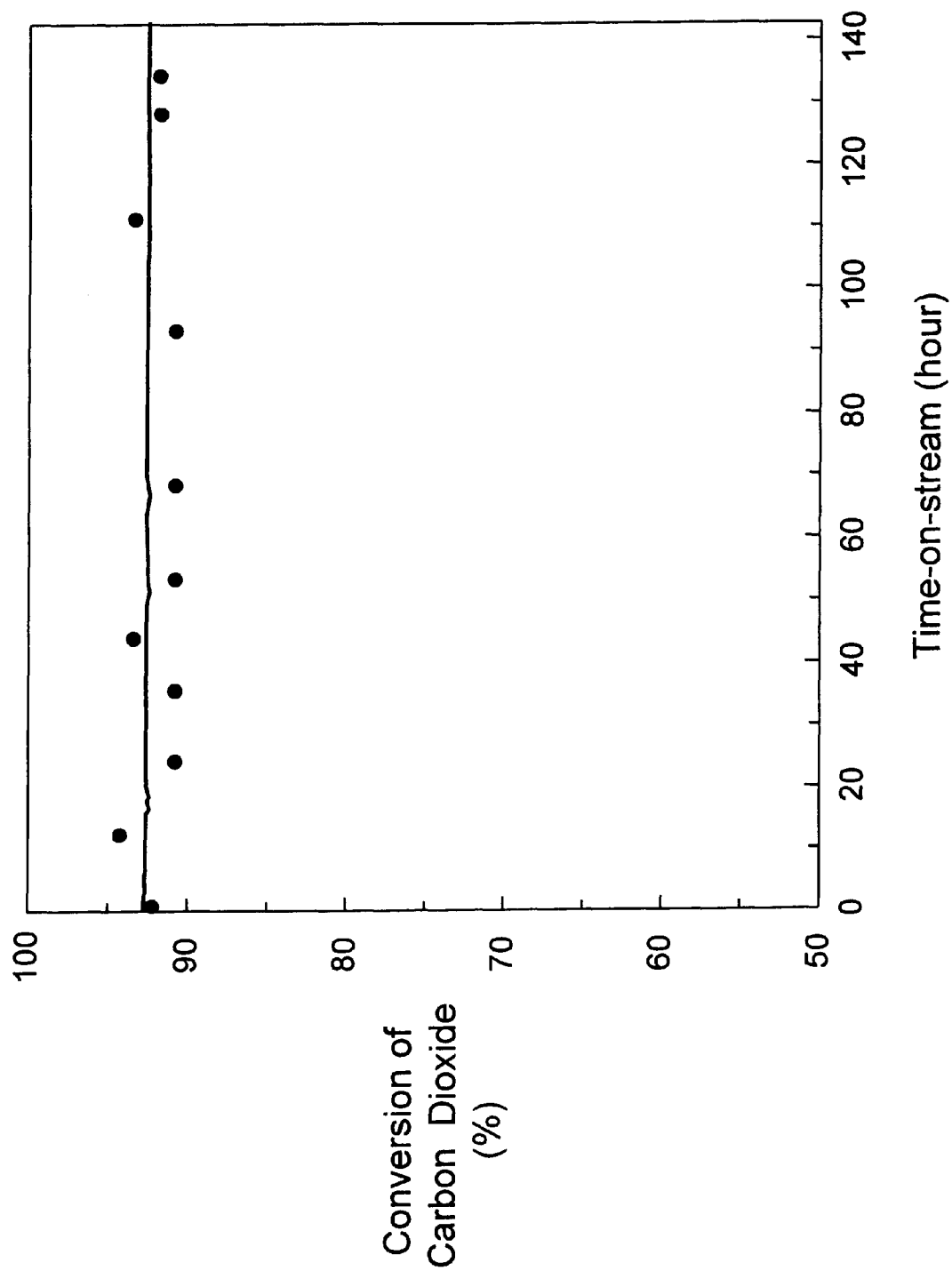

PROCESS FOR PREPARING SUPPORTED NICKEL CATALYST FOR REFORMING HYDROCARBONS

The present application is a continuation-in-part of U.S. Ser. No. 08/601,025 filed Feb. 23, 1996 based now U.S. Pat. No. 5,855,815 on PCT Application PCT/KR94/00113 filed Aug. 23, 1994, claiming priority from Korean Patent Application 93-16885 filed Aug. 25, 1993, the disclosure of which Ser. No. 08/601,205 is incorporated by reference, and a continuation-in-part of U.S. Ser. No. 08/393,872 filed Feb. 24, 1995, now abondoned claiming priority from Korean Patent Application 94-3664 filed Feb. 26, 1994 (issued Dec. 5, 1997 as Korean Patent 132012).

FIELD OF THE INVENTION

The present invention relates to a process for preparing supported nickel catalyst for reforming hydrocarbons. In particular, the present invention relates to a process for preparation of nickel catalyst supported on silicon and/or alumina-containing support for reforming hydrocarbons by using carbon dioxide and if desired, steam and/or oxygen as an oxidant.

BACKGROUND OF THE INVENTION

Supported nickel catalysts are widely used in reduction reaction such as reforming reaction, hydrogenation and methanation for their high activity of nickel metal, and thus are industrially very important. In particular, supported nickel catalysts are used for steam reforming of natural gas, oil and naphtha, and thus for producing synthesis gas which is major starting material of C1-chemistry in chemical industry. These catalysts are also used in the production of synthesis gas which is raw material of methanol, ammonia and oxygen-containing compounds.

Examples of the processes for preparing supported nickel catalysts generally include co-precipitation, impregnation, ion exchange, precipitation-deposition, sol-gel, and aerogel methods. The propertiess of the catalysts vary depending on the method of preparation and treatment of the nickel catalysts.

German Patent Laid-Open Publication No.2,255,909 disclosed that $Ni_6Al_2(OH)_{16}CO_3 4H_2O$, a precursor of catalyst, was prepared by co-precipitation method, and then Ni-Al type catalyst was prepared by calcining the precursor and the catalyst was used for steam reforming reaction of naphtha. Another German Patent Laid-Open Publication No.2,024,282 disclosed that supported nickel catalyst which was steam reforming catalyst of methane was prepared by a co-precipitation method comprising adding $Na_2CO_3$ to an aqueous solution containing 15.3% of $Ni(NO_3)_2 6H_2O$ and 7.6% of $Al(NO_3)_2 9H_2O$.

Japanese Patent Laid-Open Publication No.57-156,303 suggested a method of loading a nickel metal component by an impregnating method on natural zeolite. In the specification, natural zeolite was added to a 1 molar of aqueous solution of $Ni(NO_3)_2$, impregnated at 100° C. for one hour and then calcined at 400° C. for one hour. The prepared catalyst has a higher activity than that of a general nickel catalyst supported on alumina when used in the steam reforming reaction of natural gas.

Generally, supported nickel catalysts are mostly prepared by wet methods. However, these wet methods have problems that they require a drying step and acidic or basic waste water may be formed depending on preparing method. Therefore, these methods are difficult to apply the process industrially.

The present inventors have carried out extensive studies in order to solve the problems of the known wet methods and to find a process for preparing a supported nickel catalyst for reforming hydrocarbons with high activity without having a drying step and waste water problem. As a result, the present inventors have now found that by mixing a nickel salt and, if necessary, an alkali metal salt and/or alkaline earth metal salt with a silicon and/or aluminum-containing a support such as zeolite, silica and alumina, decomposing metal salts while melting all the salts and calcining the decomposed metals at 300° C. to 1200° C., supported nickel catalysts can be produced. The present invention has been attained on the basis of this finding.

SUMMARY OF THE INVENTION

It is an object of the present invention to provide a process for preparing supported nickel catalyst having high activity for reforming methane which not only can be used in place of expensive noble metal-supported catalyst but also can eliminate a drying step and waste water problems.

It is another object of the present invention to provide a process for preparing supported nickel or alkali metal and/or alkaline earth metal-promoted nickel catalysts which have high activity in the reforming reaction of hydrocarbons using carbon, dioxide,and, if desired, steam and/or oxygen as an oxidant.

In an aspect of the present invention, there is provided a process for preparing supported a nickel catalyst, which comprises-mixing a nickel salt having a low melting point of 100° C. or less and, if necessary, alkali metal salt and/or alkaline earth metal salt with silicon and/or aluminum-containing support such as zeolite, silica and alumina having surface area of 100 $m^2/g$ or more, decomposing metal salts while melting all the salts by heating them to a temperature above the melting points of the salts and then calcining the decomposed metal salts at 300° C. to 1200° C.

Other objects and advantages will be apparent to those who have ordinary skill in the art from the following description.

BRIEF DESCRIPTION OF THE DRAWING

The FIGURE is a graph showing the catalytic activities depending on reaction time.

DETAILED DESCRIPTION OF THE INVENTION

The present invention relates to a process for preparing supported nickel catalyst for reforming hydrocarbons.

The procedure for preparing supported nickel catalyst for reforming hydrocarbons is as follows: nickel salt having melting point of 100° C. or less and, if necessary, alkali metal salt and/or alkaline earth metal salt are mixed with silicon and/or aluminum-containing support such as zeolite, silica and alumina having surface area of 100 $m^2/g$ or more. Metal salts are decomposed by melting all the salts in the course of heating them above the melting points of the salts. The resulting mixture including the decomposed metal salts is subjected to calcining at 300° C. to 1200° C.

The present invention will be explained in detail in the following.

Metal salts and silicon and/or aluminum-containing support are uniformly mixed preferably by grinding them in a mortar or ball mill.

When melting salts, it is preferred to melt metal salts at above melting points of metal salts, particularly 100° C. to 400° C. in a tubular furnace.

Calcination can be carried out at 300° C. to 1200° C. under oxygen or oxygen-containing gas stream.

Examples of silicon and/or aluminum-containing support are zeolite, silica, gamma-alumina, silicate and silica-alumina. In particular, zeolite support having pentasil-type structure (molar ratio of Al/Si=0 to 1.0) is preferred.

Examples of alkali metal salts are potassium, sodium and cesium salts.

Examples of alkaline earth metal salts are calcium, magnesium, strontium and barium salts.

As the above metal salts, the nitrate, chloride, acetate and carbonate of the alkali metal, and alkaline earth metal having low melting point of 500° C. or less are preferred. The same salts of nickel having a melting point of 100° C. or less are also preferred. The nitrate is the salt generally used.

The contents of nickel, alkali metal and alkaline earth metal in the catalyst are preferably 1 to 20% by weight, 10% by weight or less and 20% by weight or less, respectively.

The present invention will now be explained in more detail with reference to the following examples, but it is to be understood that the present invention is not restricted thereto and various modification are possible within the scope of the invention.

EXAMPLE 1

Pentasil-type ZSM-5 crystalline zeolite I (molar ratio of silicon/aluminum: >500) was mixed with nickel nitrate (melting point: 56.7° C.), calcium nitrate (melting point: 39.7° C.) and potassium nitrate (melting point: 370° C.) in a molar ratio of K:Ni:Ca =0.08:1.0:3.2. All the nitrates were melted by heating them from room temperature to 400° C. at a rate of 2° C. per minute increase under a stream of argon, the resulting molten nitrates were decomposed at 400° C. for four hours under a stream of oxygen and then the decomposed nitrates were supported on zeolite I by heat treatment to 650° C. for four hours to give a K-Ni-Ca/zeolite I (molten) catalyst. The catalyst prepared above has a specific surface area of 180 m$^2$/g as measured by BET method at liquid nitrogen temperature in a nitrogen adsorption.

In order to determine the activity of the prepared catalyst, the catalyst was used in the reforming reaction of methane using carbon dioxide. Namely, to ¼ inch fixed-bed quartz reactor was charged the K-Ni-Ca/zeolite I catalyst prepared by the above melting method, after pretreatment with hydrogen at 700° C. Then the reactant mixture was reacted over the catalyst at 700° C. under atmospheric pressure, hourly space velocity of 60,000 by setting the partial pressure of carbon dioxide to 0.25 atm and the molar ratio of carbon dioxide to methane to 1:1. The gaseous compositions of reactants, products, and nitrogen added as diluent and internal standard were analyzed by on-line gas chromatograph with a thermal conductivity detector unit. The conversions of carbon dioxide and methane and the yields of carbon monoxide and hydrogen measured under the above mentioned reaction condition are summarized in Table 1.

Comparative Example

In this Comparative Example, a catalyst having the same component and composition as Example 1 was prepared by an impregnating method.

The nitrates of the same metal in Example 1 were dissolved in water to give aqueous solution. To this aqueous solution was added crystalline zeolite I in a same weight. After mixing with a stirrer, water was evaporated and dried at 120° C. using electric heater and then calcining was carried out by heating to 650° C. in a electric furnace for four hours to give a K-Ni-Ca/zeolite I (impregnated) catalyst. The catalyst thus prepared has a specific surface area of 181 m$^2$/g as measured by the same method in Example 1.

The catalytic activity of the K-Ni-Ca/zeolite I (impregnated) catalyst prepared above was measured in the same manner as in Example 1. The reaction results are summarized in Table 1.

EXAMPLE 2

In this Example, catalyst stability depending or reaction time was measured by applying the catalyst prepared by the same manner as in Example 1 in the reforming reaction of methane using carbon dioxide. The same reaction condition as Example 1 was applied except that the reaction temperature was 800° C. The activities depending on reaction time are summarized in the FIG. The conversion of carbon dioxide was 93%, which was close to thermodynamic equilibrium value, and the catalytic activity was maintained nearly constant even if reaction was carried out at high temperature of 800° C. over 140 hours. When measuring the weight of the catalyst after reaction, there was no sign of weight increase due to coke formation. The shape of catalyst measured by scanning electron microscope after reaction showed no coke formation and was nearly the same as that of the catalyst before reaction.

EXAMPLE 3

Nickel-Magnesium/zeolite I (molten) catalyst (molar ratio of Ni:Mg =1:2.2) having the same nickel content as Example 1 was prepared by the same method described in Example 1 by using nickel nitrate as a precursor of nickel, magnesium nitrate (m.p =89° C.) as a precursor of magnesium and the crystalline zeolite I used in Example 1 as a support. The catalytic activity of the catalyst thus prepared was measured under the same reaction condition as Example 1. The results are summarized in Table 1.

EXAMPLE 4

Nickel/zeolite I (molten) catalyst having the same nickel content as Example 1 was prepared by the same method described in Example 1 by using nickel nitrate as a precursor of nickel and the same crystalline zeolite I used in Example 1 as a support. The catalytic activity of the catalyst thus prepared was measured under the same reaction condition as Example 1. The results are summarized in Table 1.

EXAMPLE 5

Nickel/zeolite II (molten) catalyst having the same nickel content as Example 1 was prepared by the same method described in Example 1 by using nickel nitrate as a precursor of nickel and crystalline zeolite II (molar ratio of silicon:aluminum =50:1) having pentasil-type ZSM-5 structure as a support. The catalytic activity of the catalyst thus prepared was measured under the same reaction condition as Example 1. The results are summarized in Table 1.

EXAMPLE 6

Nickel/zeolite III (molten) catalyst having the same nickel content as Example 1 was prepared by the same method described in Example 1 by using nickel nitrate as a precursor of nickel and crystalline zeolite III (molar ratio of silicon:aluminum =30:1) having pentasil-type ZSM-5 structure as a support. The catalytic activity of the catalyst thus prepared was measured under the same reaction condition as Example 1. The results are summarized in Table 1.

Example 7

Nickel/silica (molten) catalyst having the same nickel content as Example 1 was prepared by the same method described in Example 1 by using nickel nitrate as a precursor of nickel and silica as support. The catalytic activity of the catalyst thus prepared was measured under the same reaction condition as Example 1. The results are summarized in Table 1.

EXAMPLE 8

Nickel/gamma-alumina (molten) catalyst having the same nickel content as Example 1 was prepared by the same method described in Example 1 by using nickel nitrate as a precursor of nickel and gamma-alumina as a support. The catalytic activity of the catalyst thus prepared was measured under the same reaction condition as Example 1. The results are summarized in Table 1.

C. and space velocity of 60,000, it was seen that K-Ni-Ca/zeolite I (molten) catalyst prepared by loading nickel, potassium and calcium on zeolite I support in a melting method showed improved conversion above about 20% or more and improved yield, as compared with K-Ni-Ca/zeolite I (impregnated) catalyst prepared by impregnating method. In addition, in the case of various kind of supported nickel catalyst prepared in a melting method, the conversions of methane and carbon dioxide and the yields of hydrogen and carbon monoxide were 70 to 80%, which were closed to thermodynamic equilibrium conversions and yields.

As seen from the FIG., high catalytic activity of K-Ni-Ca/zeolite I (molten) catalyst is maintained without coke formation and decreasing catalytic activity even if reaction is carried out at a high temperature of 800° C. for 140 hours or more.

TABLE 1

| Ex. | Catalyst | Conversion(%) | | Yield(%) | |
|---|---|---|---|---|---|
| | | Carbon dioxide | methane | carbon monoxide | hydrogen |
| Example 1 | K—Ni—Ca/zeolite I (molten) | 79 | 78 | 79 | 78 |
| Com. Ex 1 | K—Ni—Ca/zeolite I (impregnated) | 58 | 59 | 59 | 59 |
| Example 3 | Ni—Mg/zeolite I (molten) | 69 | 83 | 75 | 76 |
| Example 4 | Ni/zeolite I (molten) | 78 | 78 | 77 | 77 |
| Example 5 | Ni/zeolite II (molten) | 77 | 79 | 78 | 78 |
| Example 6 | Ni/zeolite III (molten) | 68 | 72 | 70 | 71 |
| Example 7 | Ni/silica (molten) | 75 | 77 | 76 | 76 |
| Example 8 | Ni/gamma-alumina (molten) | 78 | 78 | 72 | 78 |

EXAMPLE 9

The catalytic activity of the catalyst used in Example 1 was measured under the same reaction condition as Example 1 by using steam in a steam/methane ratio of 1/10 in addition to methane and carbon dioxide as reactants. As a result, the conversions of methane and carbon dioxide were 76% and 79%, respectively. The yields of carbon monoxide and hydrogen were 74% and 82%, respectively. The conversion of carbon dioxide and the yield of hydrogen increased by 1% and 3%, respectively while the conversion of methane and the yield of carbon monoxide decreased by 3% each, as compared with those of Example 1. The synthesis gas ratio (carbon monoxide/hydrogen) was 1.11, which increased by 12% as compared with that of Example 1.

EXAMPLE 10

The catalytic activity of the catalyst used in Example 1 was measured under the same reaction condition as Example 1 by using oxygen in a oxygen/methane ratio of 1/10 in addition to methane and carbon dioxide as reactants. As a result, the conversions of methane and carbon dioxide were 80% and 66%, respectively. The yields of carbon monoxide and hydrogen were 74% and 80%, respectively. The conversion of carbon dioxide and the yield of hydrogen increased by 1% and 2%, respectively while the conversion of methane and the yield of carbon monoxide decreased by 1.3% and 5%, respectively, as compared with those of Example 1. The synthesis gas ratio (carbon monoxide/hydrogen) was 1.08, which increased by 9% as compared with that of Example 1.

As shown in Table 1, by comparing the catalytic activity on reforming reaction of methane using carbon dioxide under atmospheric pressure, reaction temperature of 7000°

What is claimed is:

1. A process for preparing a supported nickel catalyst, which comprises mixing a nickel salt having a melting point of 100° C. or less, an alkali metal salt and/or an alkaline earth metal salt with a zeolite support having a surface area of 100 m$^2$/g or more, melting the salts by heating said salts to a temperature above the melting points of the salts, decomposing the resulting molten metal salts and then calcining the resulting mixture including the decomposed metal salts at a temperature of 300° C. to 1200° C.

2. A process for preparing a supported nickel catalyst according to claim 1 in which the mixing of the metal salts with the zeolite support is carried out by grinding said salts and the zeolite support uniformly in mortar or ball mill.

3. A process for preparing a supported nickel catalyst according to claim 1 in which the zeolite support has pentasil-type structure and a molar ratio of aluminum silicon of 0 to 1.0.

4. A process for preparing a supported nickel catalyst according to claim 1 in which the alkali metal component of the catalyst is K, Na or Cs.

5. A process for preparing a supported nickel catalyst according to claim 1 in which the alkaline earth metal component of the catalyst is Ca, Mg, Sr or Ba.

6. A process for preparing a supported nickel catalyst according to claim 1, in which the alkali metal and/or alkaline earth metal salt has a melting point of 500° C. or less.

7. A process for preparing supported nickel catalyst according to claim 1 in which the nickel content of the catalyst is 1 to 20% by weight.

8. A process for preparing a supported nickel catalyst according to claim 1, in which the alkali metal is present in the catalyst in an amount up to 10% by weight.

9. A process for preparing a nickel catalyst according to claim 1, in which the alkaline earth metal is present in the catalyst in an amount up to 20% by weight.

10. A process for preparing a nickel catalyst according to claim 1, in which the nickel salt is the nitrate.

11. A process of preparing a nickel catalyst according to claim 6, in which a nitrate salt of the alkali metal and/or alkaline earth metal is used.

12. A nickel catalyst produced by the process according to claim 1.

13. A nickel catalyst produced by the process according to claim 7.

14. A nickel catalyst produced by the process according to claim 8.

15. A nickel catalyst produced by the process according to claim 9.

16. A nickel catalyst produced by the method according to claim 2.

17. A nickel catalyst produced by the method according to claim 3.

18. A nickel catalyst produced by the method according to claim 6.

19. A nickel catalyst produced by the method according to claim 10.

20. A nickel catalyst produced by the method according to claim 11.

* * * * *

UNITED STATES PATENT AND TRADEMARK OFFICE
CERTIFICATE OF CORRECTION

PATENT NO. : 6,242,380 B1
DATED : June 5, 2001
INVENTOR(S) : Sang-Eon Park et al.

It is certified that error appears in the above-identified patent and that said Letters Patent is hereby corrected as shown below:

Title page,
Item [63], "on Feb. 23, 1996" should read -- as PCT/KR94/00113 on Aug. 23, 1994 --

Item [30], before "Feb." insert -- Aug. 25, 1993 (KR) ... 93-16885 --.

Signed and Sealed this

Twenty-ninth Day of January, 2002

Attest:

Attesting Officer

JAMES E. ROGAN
Director of the United States Patent and Trademark Office